(12) United States Patent
Omata et al.

(10) Patent No.: US 9,154,070 B2
(45) Date of Patent: Oct. 6, 2015

(54) CONTROLLER FOR AC MOTOR

(71) Applicant: DENSO CORPORATION, Kariya, Aichi-pref. (JP)

(72) Inventors: Ryuji Omata, Anjo (JP); Takeshi Itoh, Nagoya (JP); Hirofumi Kako, Kariya (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 13/774,667

(22) Filed: Feb. 22, 2013

(65) Prior Publication Data

US 2013/0214713 A1 Aug. 22, 2013

(30) Foreign Application Priority Data

Feb. 22, 2012 (JP) .................................. 2012-35961

(51) Int. Cl.
  *H02P 21/00* (2006.01)
  *H03K 5/00* (2006.01)
  *H02P 21/14* (2006.01)

(52) U.S. Cl.
  CPC ........ *H02P 21/0096* (2013.01); *H02P 21/0035* (2013.01); *H02P 21/14* (2013.01)

(58) Field of Classification Search
  CPC ..... H02P 21/14; H02P 21/00; H02P 21/0035; H02P 21/0096; G05B 2219/37169
  USPC ........................................ 318/400.02, 400.13
  See application file for complete search history.

(56) References Cited

U.S. PATENT DOCUMENTS

| 6,229,719 | B1 * | 5/2001 | Sakai et al. ..................... 363/37 |
| 6,630,809 | B2 | 10/2003 | Chen et al. |
| 6,781,333 | B2 * | 8/2004 | Koide et al. .................... 318/432 |
| 8,143,838 | B2 * | 3/2012 | Akiyama ....................... 318/807 |
| 2001/0002784 | A1 * | 6/2001 | Masaki et al. ................. 318/727 |
| 2004/0051495 | A1 * | 3/2004 | Kaneko et al. ................ 318/807 |

(Continued)

FOREIGN PATENT DOCUMENTS

| GB | 2481328 A | * 12/2011 |
| JP | 10-225199 | 8/1998 |

(Continued)

OTHER PUBLICATIONS

Office Action (11 pgs.) dated Aug. 19, 2014 issued in co-pending U.S. Appl. No. 13/774,590.

(Continued)

*Primary Examiner* — Bentsu Ro
*Assistant Examiner* — Zemenay Truneh
(74) *Attorney, Agent, or Firm* — Nixon & Vanderhye PC (57) ABSTRACT

A controller for a three-phase AC motor includes a current sensor and a current estimation section. The current sensor detects current flowing through one phase of the motor. The one phase is defined as a sensor phase. The current estimation section calculates a current phase relative to an axis of the sensor phase based on α-axis current and β-axis current in a stationary coordinate system defined by a α-axis parallel to the sensor phase axis and a β-phase perpendicular to the sensor phase axis. The current estimation section estimates current flowing through another phase of the motor based on the current phase and the detected current. The current estimation section calculates the α-axis current based on the detected current. The current estimation section calculates the β-axis current based on the detected current and a command value for the current flowing through the other phase of the motor.

8 Claims, 8 Drawing Sheets

(56) References Cited

U.S. PATENT DOCUMENTS

| | | | |
|---|---|---|---|
| 2004/0263114 A1* | 12/2004 | Kaneko et al. | 318/811 |
| 2006/0006825 A1* | 1/2006 | Inaguma et al. | 318/432 |
| 2007/0069681 A1 | 3/2007 | Imura et al. | |
| 2008/0079385 A1* | 4/2008 | Hashimoto et al. | 318/801 |
| 2008/0129243 A1 | 6/2008 | Nashiki | |
| 2008/0157709 A1 | 7/2008 | Tobari et al. | |
| 2009/0160377 A1 | 6/2009 | Yamada | |
| 2010/0123418 A1 | 5/2010 | Itoh et al. | |
| 2010/0194319 A1* | 8/2010 | Ito et al. | 318/400.13 |
| 2010/0194329 A1* | 8/2010 | Lu et al. | 318/798 |
| 2010/0207555 A1* | 8/2010 | Ide et al. | 318/400.02 |
| 2011/0012544 A1 | 1/2011 | Schulz et al. | |
| 2011/0248659 A1* | 10/2011 | Balazovic et al. | 318/400.33 |
| 2012/0007528 A1 | 1/2012 | Nakatsugawa et al. | |
| 2012/0212162 A1 | 8/2012 | Wu et al. | |

FOREIGN PATENT DOCUMENTS

| | | |
|---|---|---|
| JP | 2000-175483 | 6/2000 |
| JP | 2004-064903 | 2/2004 |
| JP | 2004-159391 | 6/2004 |

OTHER PUBLICATIONS

Office Action (1 page) dated Jan. 24, 2014 issued in corresponding Japanese Application No. 2012-035961 and English translation (1 page).
Office Action (9 pages) dated Sep. 3, 2014, issued in copending U.S. Appl. No. 13/774,279 to Omata, filed Feb. 22, 2013.
Omata et al, U.S. Appl. No. 13/744,595, filed Feb. 22, 2013.
Omata et al, U.S. Appl. No. 13/744,619, filed Feb. 22, 2013.
Omata et al, U.S. Appl. No. 13/744,279, filed Feb. 22, 2013.
Omata et al, U.S. Appl. No. 13/744,295, filed Feb. 22, 2013.
Office Action (11 pgs.) dated Oct. 6, 2014 issued in co-pending U.S. Appl. No. 13/774,619.
Notice of Allowance dated Apr. 3, 2015 issued in co-pending U.S. Appl. No. 13/774,279 (10 pgs.).
Office Action (11 pages) dated Feb. 13, 2015 issued in co-pending U.S. Appl. No. 13/774,619.
Notice of Allowance dated Mar. 17, 2015 issued in co-pending U.S. Appl. No. 13/774,590.
Notice of Allowance dated Jul. 31, 2015 issued in co-pending U.S. Appl. No. 13/774,619 to Omata, filed Feb. 22, 2013 (9 pgs.).

* cited by examiner

CONTROLLER FOR AC MOTOR

CROSS REFERENCE TO RELATED APPLICATION

This application is based on Japanese Patent Application No. 2012-35961 filed on Feb. 22, 2012, the contents of which are incorporated herein by reference.

FIELD

The present disclosure relates to a controller for controlling a three-phase AC motor by using a current sensor that detects an electric current flowing through one of three phases of the AC motor.

BACKGROUND

In recent years, from social demands for low-fuel consumption and low exhaust emission, there has been an increased attention to an electric vehicle or a hybrid vehicle which has an alternate-current (AC) motor to run. For example, in a hybrid vehicle, an AC motor is connected to a direct-current (DC) power source such as a rechargeable battery unit through a power converter such as an inverter. The inverter converts a DC voltage supplied from the DC power source to an AC voltage and drives the AC motor with the AC voltage.

A typical control system for controlling an AC motor mounted on an electric vehicle or a hybrid vehicle uses two or three current sensors to detect two or three of three phases of the AC motor. The AC motor is controlled based on outputs (i.e., current detection values) of the current sensors. In this type of motor control system, two or three current sensors are provided to one AC motor. Therefore, the size and cost of the control system may be increased.

A method of reducing the number of current sensors used to control an AC motor has been known. For example, in JP-A-2004-64903, one current sensor is provided to a DC power line to detect a bus current. However, if a current sensor is provided to a DC power line in a control system for controlling a high-powered motor mounted on a vehicle, conduction noise may be increased due to an extension of the DC power line. JP-A-10-225199, JP-A-2001-145398 corresponding to U.S. Pat. No. 6,229,719, JP-A-2004-159391, and JP-A-2008-86139 corresponding to US 2008/0079385 disclose a method of controlling an AC motor by using a current sensor that detects an electric current flowing through one of three phases of the AC motor.

In JP-A-10-225199, a d-axis current Id and a q-axis current Iq are calculated from a state equation, which is derived from a motor constant, using a current detection value of one of three phases of an AC motor. However, the motor constant changes with a temperature. Therefore, the d-axis current Id and the q-axis current Iq, which are calculated from the state equation, may have large estimation errors so that control may become unstable. Further, since the calculation is complex, it may be difficult to cause an electronic control unit (ECU) to perform the calculation.

In JP-A-2001-145398, a d-axis current Id and a q-axis current Iq of an AC motor are calculated by dq transformation of a current detection value of one of three phases of the AC motor and current estimation values of the other phases. Then, averaging is performed through a first order lag filter, and then inverse dq transformation is performed. However, a lag may occur in the current estimation values due to the first order lag filter so that control may become unstable.

In JP-A-2004-159391, an electric current flowing through one (e.g., U-phase) of three phases of an AC motor is detected by a current sensor. Then, current estimation values of the other phases (e.g., V-phase and W-phase) are calculated based on a current detection value detected by the current sensor, a d-axis current command value, a q-axis current command value, and an electrical angle of the AC motor.

Specifically, a U-phase current phase angle θ1 (=α+θ) is calculated by adding a command current phase angle α, which is formed by a q-axis and a combined vector of a d-axis current command value Id* and a q-axis current command value Iq*, to an angle θ, which is formed by an U-phase axis of a stator and a rotor of the AC motor. Then, a current amplitude Ia is calculated from a formula (A) using the U-phase current phase angle θ1 and a current detection value Iu detected by the current sensor. Then, current estimation values Iv and Iw of the other phases are calculated from the respective formulas (B) and (C) using the current amplitude Ia and the U-phase current phase angle θ1.

$$Ia = Iu / \{\sqrt{1/3} \times [-\sin(\theta1)]\} \quad (A)$$

$$Iv = \sqrt{1/3} \times Ia \times [-\sin(\theta1 + 120°)] \quad (B)$$

$$Iw = \sqrt{1/3} \times Ia \times [-\sin(\theta1 + 240°)] \quad (C)$$

A d-axis current Id and a q-axis current Iq are calculated based on the current detection value Iu and the current estimation values Iv and Iw. Then, the current flowing through the AC motor is feedback-controlled by calculating a voltage command value of the AC motor so that the d-axis current Id and the q-axis current Iq can be equal to the d-axis current command value Id* and the d-axis current command value Iq*, respectively.

It is noted that a current vector of an AC motor changes with a command current vector (current vector corresponding to a current command value). However, due to effects of the control error and the feedback control, there is a deviation (i.e., difference) between the current vector and the command current vector. Accordingly, a command current phase differs from an actual current phase and does not actually reflect the actual current phase.

However, according to JP-A-2004-159391, by using the U-phase current phase angle calculated from the command current phase angle, the current estimation values of the other phases are calculated without consideration of the actual current phase. As a result, there is a possibility that the current estimation values do not have accuracy high enough to control the AC motor.

In JP-A-2008-86139, an electric current flowing through one (e.g., U-phase) of three phases of an AC motor is detected by a current sensor. Then, current estimation values of the other phases (e.g., V-phase and W-phase) are calculated based on a current detection value detected by the current sensor and three-phase current command values of the AC motor.

Specifically, the AC motor is controlled by dq transformation using an electrical angle based on a current detection value Iu detected by the current sensor and three-phase electric command values Iv* and Iw* of the other phases. The electric command values Iv* and Iw* are calculated by transformation using an electrical angle based on a d-axis current command value Id* and a d-axis current command value Iq* of the AC motor. However, since the electric command values are simply used as a substitute for current detection values of the other phases, a command current phase does not actually reflect an actual current phase. Therefore, in a vehicle, in which a torque and a rotation speed are required to change from time to time, estimated currents will not be calculated sufficiently accurately, and hence the AC motor will not be controlled properly.

As described above, there remains a technical difficulty in controlling a high-powered AC motor by using one current sensor.

SUMMARY

In view of the above, it is an object of the present disclosure to provide a controller for achieving stable control of a three-phase AC motor by using a current sensor that detects an electric current flowing through one of three phases of the AC motor (i.e., an electric current flowing through one of three outputs of an inverter for driving the AC motor).

According to an aspect of the present disclosure, a three-phase AC motor controller includes a current sensor and a current estimation section. The current sensor detects a current flowing through one phase of the AC motor. The one phase is defined as a sensor phase. The current estimation section calculates a current phase relative to an axis of the sensor phase based on a α-axis current and a β-axis current in a stationary coordinate system defined by a α-axis parallel to the axis of the sensor phase and a β-phase perpendicular to the axis of the sensor phase. The current estimation section calculates an estimation value of a current flowing through another phase of the AC motor based on the current phase and the current detected by the current sensor. The current estimation section calculates the α-axis current based on the current detected by the current sensor. The current estimation section calculates the β-axis current based on the current detected by the current sensor and a command value for the current flowing through the other phase of the AC motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment of the present disclosure is described below with reference to the drawings. Throughout the embodiment, the term "current" means "electric current". In other words, the term "current" does not mean "present".

A driving system of a hybrid vehicle according to an embodiment of the present disclosure is described below with reference to FIG. 1. An internal-combustion engine 1, a first alternating-current (AC) motor 13A, and a second AC motor 13B are mounted on the vehicle. Wheels 2 of the vehicle are driven by driving force of the second AC motor 13B and driving force that is transmitted to a rotating shaft of the second AC motor 13B by driving the first AC motor 13A against an output of the engine 1. A crankshaft of the engine 1, a rotating shaft of the first AC motor 13A, and the rotating shaft of the second AC motor 13B are coupled together through a mechanical power distribution mechanism 3 (e.g., planetary gear mechanism). The rotating shaft of the second AC motor 13B is coupled through a differential reduction gear 4 to an axle 5 of the vehicle. The AC motors 13A and 13b are connected to a direct-current (DC) power source 11 such as a rechargeable battery unit through an electrical power converter 6 such as an inverter. Thus, the AC motors 13A and 13b are supplied with electrical power from the DC power source 11 through the power converter 6.

A driving force calculator 7 is provided by a computer that performs overall control of the vehicle. The driving force calculator 7 detects operating conditions of the vehicle based on signals received from sensors and switches. For example, the driving force calculator 7 can detect the operating conditions based on a brake signal from a brake sensor (not shown), an accelerator signal from an accelerator sensor (not shown), and a shift signal from an shift switch (not shown). The driving force calculator 7 exchanges controls signals and data signals with an engine controller (not shown), which controls operations of the engine 1, and a motor controller 16 (refer to FIG. 2), which controls operations of the AC motors 13A and 13B. The driving force calculator 7 outputs a driving force command according to the operation conditions of the vehicle, thereby controlling driving forces of the engine 1 and the AC motors 13A and 13B.

Figure 2:
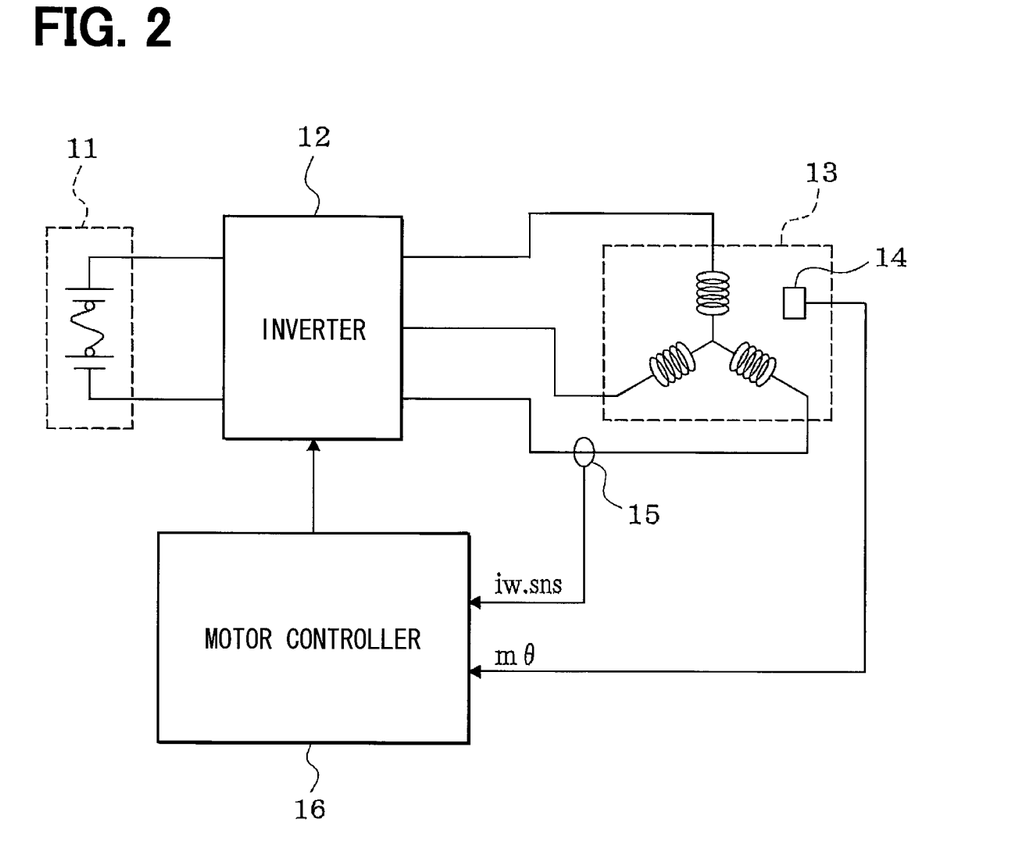
FIG. 2 is a block diagram of an AC motor control system.

Next, an AC motor control system mounted on the vehicle is described with reference to FIG. 2. It is noted that a motor control system for controlling the AC motor 13A is substantially identical to a motor control system for controlling the AC motor 13B. For the sake of simplicity, the AC motors 13A and 13B are hereinafter collectively referred to as the "AC motor 13", and a motor control system for controlling the AC motor 13 is described below.

A voltage-controlled three-phase inverter 12 is connected to the DC power source 11. The AC motor 13 is driven by the inverter 12. A boost converter (step-up converter) can be interposed between the DC power source 11 and the inverter 12.

The AC motor 13 is a permanent magnet three-phase synchronous motor having a permanent magnet built in a rotor. The AC motor 13 includes a rotor position sensor 14 (e.g., resolver) for detecting a rotation position (i.e., rotation angle) of the rotor. The AC motor 13 is provided with a current sensor 15 for detecting an electric current flowing through one phase (hereinafter referred to as the "sensor phase") of the AC motor 13. According to the embodiment, the sensor phase is a W phase. That is, the current sensor 15 detects the current flowing though the W phase of the AC motor 13. It is noted that the AC motor 13 is not limited to a permanent magnet three-phase synchronous motor. For example, the AC motor 13 can be an induction motor or a synchronous motor of another type.

The inverter 12 converts a DC voltage to three phase AC voltages U, V, and W based on leg voltage command signals UU, UL, VU, VL, WU, and WL outputted from the motor controller 16. The leg voltage command signal UU is applied to an upper switch of a U-phase leg of the inverter 12. The leg voltage command signal UL is applied to a lower switch of the U-phase leg. The leg voltage command signal VU is applied to an upper switch of a V-phase leg of the inverter 12. The leg voltage command signal VL is applied to a lower switch of the V-phase leg. The leg voltage command signal WU is applied to an upper switch of a W-phase leg of the inverter 12. The leg voltage command signal WL is applied to a lower switch of the W-phase leg.

The motor controller 16 adjusts the three-phase AC voltage applied to the AC motor 13 by performing switching control of the inverter 12 in such a manner that an output torque of the AC motor 13 can be equal to a target torque (i.e., torque command value). For example, the current flowing though the sensor phase of the AC motor 13 is detected and feedback-controlled so that a deviation (i.e., difference) between a current command value, which depends on the torque command value, and a current estimation value, which is calculated based on control information including detection values of the rotor position sensor 14 and the current sensor 15, can become small.

Figure 3:
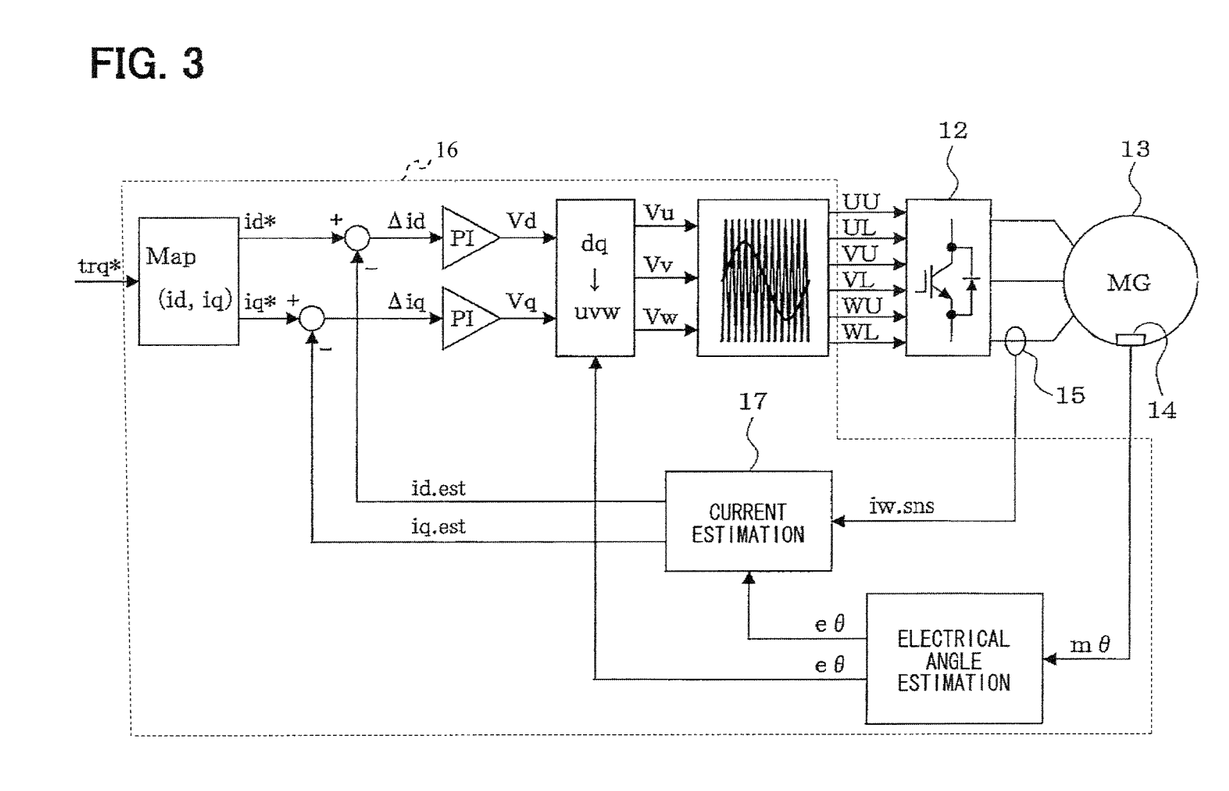
FIG. 3 is a block diagram explaining a feedback control of an AC motor.

As shown in FIG. 3, the motor controller 16 calculates a d-axis current command value id* and a q-axis current command value iq*, which are defined in a rotating coordinate system (i.e., dq coordinate system) set as a rotor coordinate system of the AC motor 13, based on a torque command value trq* using a mapping table, a formula, or the like.

Further, the motor controller 16 calculates an electrical angle eθ of the AC motor 13 based on a rotation position (i.e., rotation angle) mθ of the rotor of the AC motor 13 detected by the rotor position sensor 14. Further, a current estimation section 17 of the motor controller 16 calculates a d-axis current estimation value id.est and a q-axis current estimation value iq.est, which are defined in the rotating coordinate system, based on the electrical angle eθ and a current detection value iw.sns detected by the current sensor 15. The current detection value indicates the current flowing though the sensor phase (i.e., W-phase) of the AC motor 13. As necessary, the current estimation section 17 can calculate the d-axis current estimation value id.est and the q-axis current estimation value iq.est based on current command values iu* and iv* in addition to the electrical angle eθ and the current detection value iw.sns. The current command values iu* and iv* are current command values for the other phases (i.e., U-phase and V-phase) and calculated by inverse dq transformation based on the electrical angle eθ, the d-axis current command value id*, and the q-axis current command value iq*. It is noted that the d-axis current estimation value id.est and the q-axis current estimation value iq.est can be represented as an estimation current vector.

Then, a d-axis voltage command value Vd is calculated, for example, by proportional-integral (PI) control, so that a deviation Δid between the d-axis current command value id* and the d-axis current estimation value id.est can become small. Further, a q-axis voltage command value Vq is calculated, for example, by PI control, so that a deviation Δiq between the q-axis current command value iq* and the q-axis current estimation value iq.est can become small. In this way, the d-axis voltage command value Vd and the q-axis voltage command value Vq are calculated. It is noted that the d-axis voltage command value Vd and the q-axis voltage command value Vq can be represented as a voltage vector.

Then, three-phase voltage command values Vu, Vv, and Vw are calculated based on the d-axis voltage command value Vd, the q-axis voltage command value Vq, and the electrical angle eθ. Then, the three-phase voltage command values Vu, Vv, and Vw are converted to the leg voltage command signals UU, UL, VU, VL, WU, and WL by pulse width modulation (PWM) control such as triangle wave comparison or space vector modulation. Then, the leg voltage command signals UU, UL, VU, VL, WU, and WL are outputted to the inverter 12. The inverter 12 converts a DC voltage to a three-phase AC voltage based on the leg voltage command signals UU, UL, VU, VL, WU, and WL and applies the three-phase AC voltage to the AC motor 13. Thus, a three-phase AC current flows through the AC motor 13 so that the AC motor 13 can output torque. In order to make the output torque equal to a target torque (i.e., torque command value), a feedback control is performed by detecting the AC current flowing through the sensor phase (i.e., W-phase) of the AC motor 13 so that the deviation Δid between the current command value id* and the current estimation value id.est can become small and so that the deviation Δiq between the current command value iq* and the current estimation value iq.est can become small.

Next, a current estimation method, by which the current estimation section 17 estimates the current flowing through the AC motor 13, is described.

Generally, there is a 120 degree phase difference between any two of the currents iu, iv, and iw of three phases of the AC motor 13. Here, it is assumed that a current estimation value iu.est as a current estimation value of a current flowing through another phase (i.e., U-phase) of the AC motor 13 is calculated based on the current detection value iw.sns, indicative of the current flowing through the sensor phase (i.e., W-phase) of the AC motor 13, detected by the current sensor 15. In this case, the current detection value iw.sns and the current estimation value iu.est can be given by the following formulas (1) and (2), respectively.

$$iw.sns = Ia \times \sin(x\theta) \qquad (1)$$

$$iu.est = Ia \times \sin(x\theta - 120°) \qquad (2)$$

In the formulas (1) and (2), Ia represent the amplitude of the current and xθ represents an electrical angle corresponding to an angle formed by the sensor phase and the current vector. That is, the electrical angle xθ represents a phase of the current relative to the sensor phase. Therefore, the electrical angle xθ is hereinafter referred to as the "sensor-phase-relative current phase xθ". The sensor-phase-relative current phase xθ is 0° at a zero-crossing point where the current detection value iw.sns is 0 ampere (A) and changes from negative to positive. The sensor-phase-relative current phase xθ is 180° at a zero-crossing point where the current detection value iw.sns is 0 ampere (A) and changes from positive to negative.

The formula (2) can be rewritten as follows by using the formula (1).

$$\begin{aligned} iu.est &= Ia \times \sin(x\theta - 120°) \\ &= -\frac{1}{2} \times Ia \times \sin(x\theta) - \frac{\sqrt{3}}{2} \times Ia \times \cos(x\theta) \\ &= -\frac{1}{2} \times iw.sns - \frac{\sqrt{3}}{2} \times \frac{Ia \times \sin(x\theta)}{\tan(x\theta)} \\ &= \left\{ -\frac{1}{2} - \frac{\sqrt{3}}{2} \times \frac{1}{\tan(x\theta)} \right\} \times iw.sns \end{aligned}$$

Thus, the current estimation value iu.est of the other phase (i.e. U-phase) can be represented by the following formula (3) using the current detection value iw.sns of the sensor phase (i.e., W-phase) and the sensor-phase-relative current phase xθ.

$$iu.est = \left\{ -\frac{1}{2} - \frac{\sqrt{3}}{2} \times \frac{1}{\tan(x\theta)} \right\} \times iw.sns \qquad (3)$$

Further, the current estimation value iu.est can be represented by the following formula (4) using an estimation coefficient fu(xθ) which depends on the sensor-phase-relative current phase xθ.

$$iu.est = fu(x\theta) \times iw.sns \quad (4)$$

The estimation coefficient fu(xθ) is given as follows.

$$fu(x\theta) = -\frac{1}{2} - \frac{\sqrt{3}}{2} \times \frac{1}{\tan(x\theta)} \quad (5)$$

Figure 4:
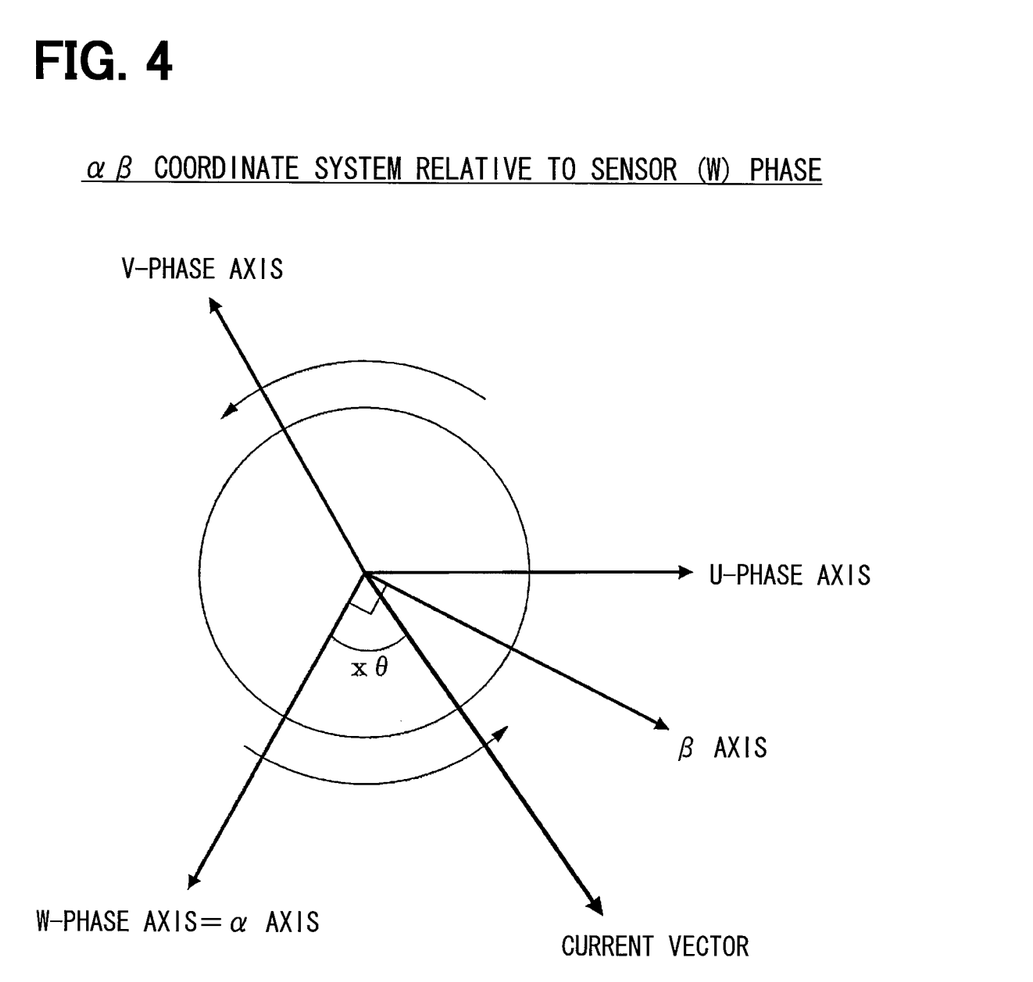
FIG. 4 is a diagram explaining a stationary coordinate system ($\alpha\beta$ coordinate system) relative to a sensor phase.

As shown in FIG. 4, when a stationary coordinate system (i.e., αβ coordinate system) is set by a α-axis parallel to an axis of the sensor phase (i.e., W-phase) and a β-axis perpendicular to the axis of the sensor phase, a α-axis current iα and a β-axis current iβ in the stationary coordinate system can be given by the following formulas (6) and (7) using the currents iu, iv, and iw of the phases of the AC motor 13.

$$i\alpha = K \times \left(iw - \frac{1}{2} \times iu - \frac{1}{2} \times iv\right) \quad (6)$$

$$i\beta = K \times \left(\frac{\sqrt{3}}{2} \times iu - \frac{\sqrt{3}}{2} \times iv\right) \quad (7)$$

In the formulas (6) and (7), K represents a transformation coefficient.

The formulas (6) and (7) can be rewritten into the following formulas (8) and (9), respectively, based on a Kirchhoff's current law (i.e., iu+iv+iw=0).

$$i\alpha = K \times \frac{3}{2} \times iw \quad (8)$$

$$i\beta = K \times \left(-\sqrt{3} \times iv - \frac{\sqrt{3}}{2} \times iw\right) \quad (9)$$

An formula (10) below can be obtained by substituting the current detection value iw.sns into the W-phase current iw of the formula (8). Further, an formula (11) below can be obtained by substituting the current detection value iw.sns into the W-phase current iw and by substituting the V-phase current command value iv* into the V-phase current iv of the formula (9).

$$i\alpha = K \times \frac{3}{2} \times iw.sns \quad (10)$$

$$i\beta = K \times \left(-\sqrt{3} \times iv* - \frac{\sqrt{3}}{2} \times iw.sns\right) \quad (11)$$

For example, the V-phase current command values iv* can be calculated by inverse dq transformation based on the electrical angle eθ of the AC motor 13, the d-axis current command value id*, and the q-axis current command value iq*.

The sensor-phase-relative current phase xθ is given by the following formula (12) using the α-axis current iα and the β-axis current iβ.

$$x\theta = \tan^{-1}(i\beta/i\alpha) \quad (12)$$

It is noted that when "tan⁻¹" is calculated, there is a possibility that the sensor-phase-relative current phase xθ does not change synchronously with the sensor phase (i.e., W-phase) depending on definitions of the currents iα and iβ. This is caused by definitions of axes (e.g., interchange between a α-axis and a β-axis or sign inversion). Therefore, for example, the sensor-phase-relative current phase xθ can be calculated by performing interchange between the α-axis and the β-axis or sign inversion so that the sensor-phase-relative current phase xθ can change synchronously with the sensor phase (i.e., so that the sensor-phase-relative current phase xθ can be 0° at the zero-crossing point where the current detection value iw.sns is zero and changes from negative to positive and so that the sensor-phase-relative current phase xθ can be 180° at the zero-crossing point where the current detection value iw.sns is zero and changes from positive to negative). Alternatively, the sensor-phase-relative current phase xθ can be calculated by adding a phase difference of ±90° to the sensor-phase-relative current phase xθ. As shown in the formula (8), the α-axis current iα can be represented by using the current iw of the sensor phase (i.e., W-phase). Therefore, by using the current detection value iw.sns as information of the sensor phase current iw, the α-axis current iα can be calculated based on the current detection value iw.sns. As shown in the formula (7), the β-axis current iβ can be represented by using the currents iu and iv of the other phases (i.e., U-phase and V-phase). Therefore, by using the current command values iu* and iv* as information of the currents iu and iv, the β-axis current iβ can be calculated based on the current command values iu* and iv*.

The current detection value iw.sns, which is actually detected by the current sensor 15, accurately reflects a real current flowing through the sensor phase. However, it is not always true that the current command values iu* and iv*, which are set based on the torque command value, real currents flowing through the other phases.

Figure 5A:
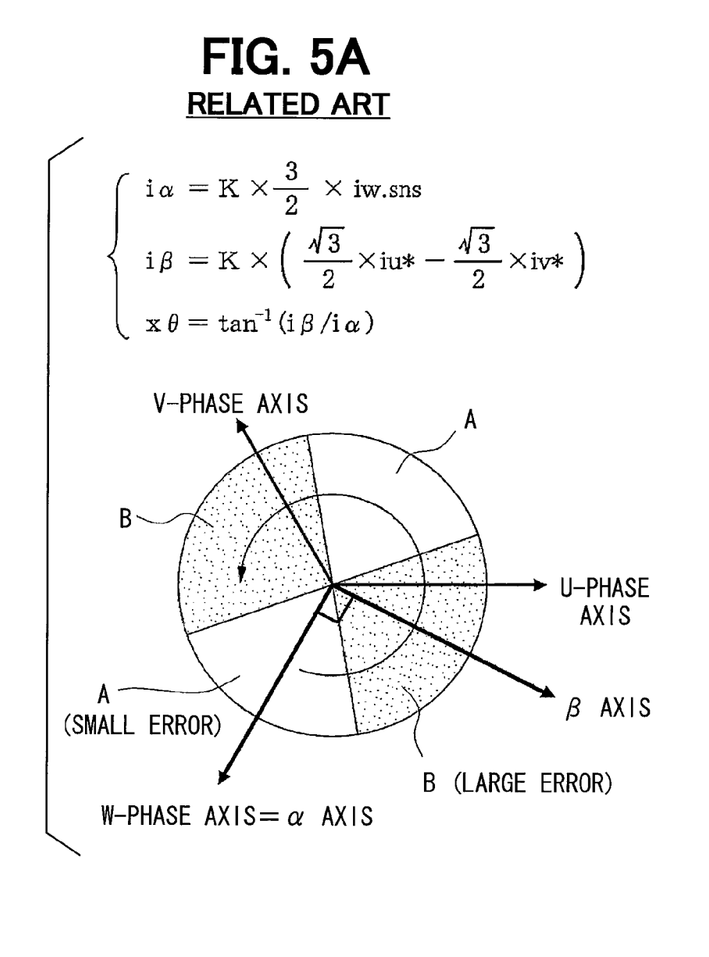
FIG. 5A is a diagram explaining a calculation error characteristic of a sensor-phase-relative current phase according to a comparison example.

Therefore, like a comparison example shown in FIG. 5A, when the α-axis current iα is calculated based on the current detection value iw.sns of the sensor phase, and the β-axis current iβ is calculated based on the current command values iu* and iv* of the other phases, calculation error of the sensor-phase-relative current phase xθ becomes small in a region A where the effect of the α-axis current iα on the sensor-phase-relative current phase xθ is small (i.e., where the effect of the current detection value iw.sns on the sensor-phase-relative current phase xθ is large). However, the calculation error of the sensor-phase-relative current phase xθ becomes large in a region B where the effect of the β-axis current iβ on the sensor-phase-relative current phase xθ is large (i.e., where the effect of the current detection value iw.sns on the sensor-phase-relative current phase xθ is small). Further, the region B is relatively wide.

Figure 5B:
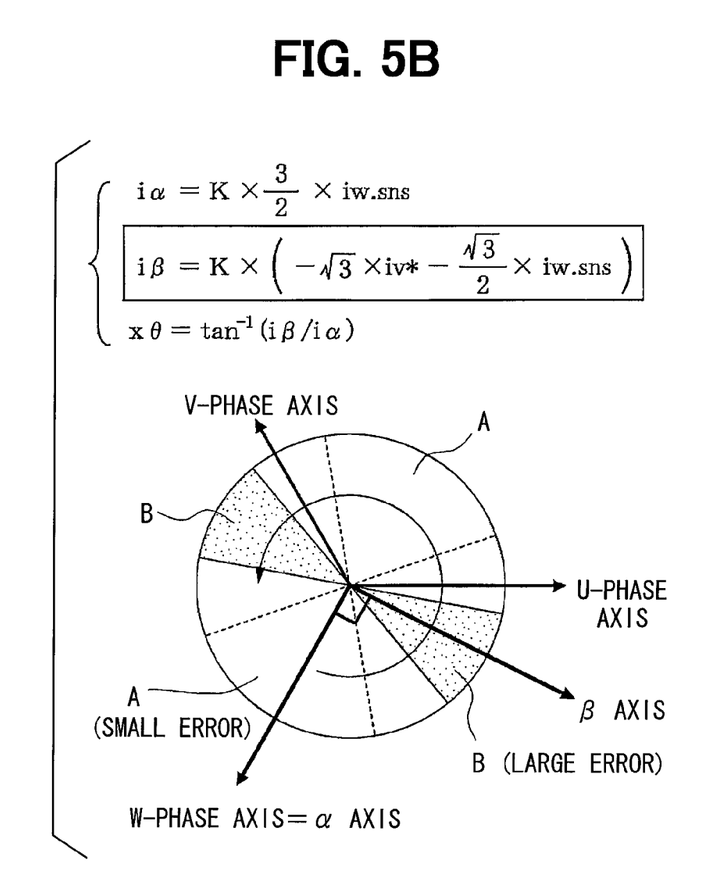
FIG. 5B is a diagram explaining a calculation error characteristic of a sensor-phase-relative current phase according to the embodiment.

The present inventors have focused attention on the fact the β-axis current iβ can be represented by the formula (9) with the current iw of the sensor phase and the current iv of the other phase (i.e., V-phase). Therefore, as shown in FIG. 5B, according to the embodiment, the α-axis current iα is calculated based on the current detection value iw.sns of the sensor phase (i.e., W-phase), and the β-axis current iβ is calculated based on the current detection value iw.sns and the current command value iv* of the other phase (i.e., V-phase) by focusing attention on the fact the β-axis current iβ can be represented by the formula (9) with the current iw of the sensor phase and the current iv of the other phase (i.e., V-phase). In such an approach, the current detection value iw.sns can have effect on the β-axis current iβ. Accordingly, while the region A where the calculation error of the sensor-phase-relative current phase xθ is small is enlarged, the region B where the calculation error of the sensor-phase-relative current phase xθ is large is narrowed.

Figure 6:
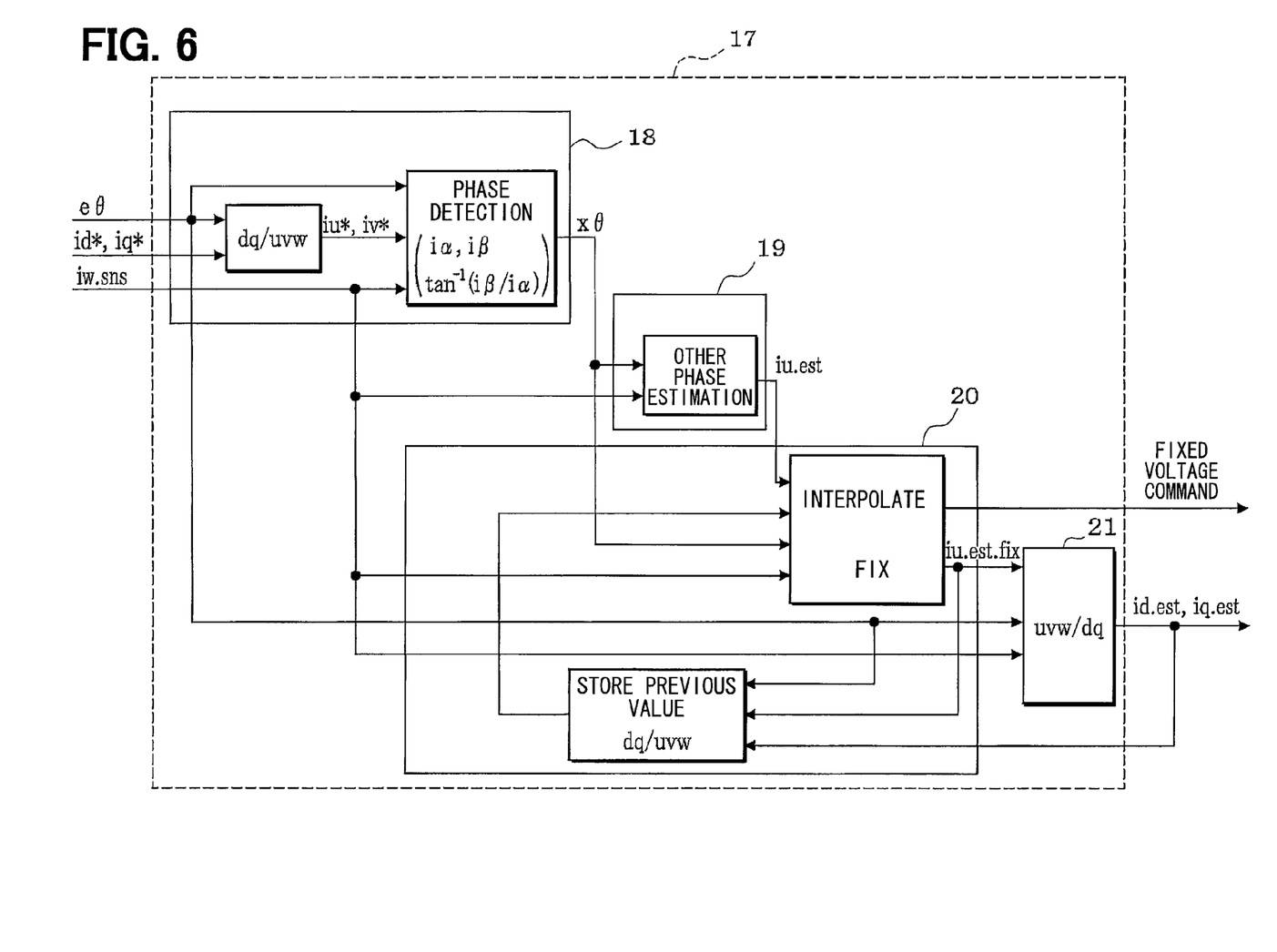
FIG. 6 is a block diagram of a current estimation section.

As shown in FIG. 6, when the currents flowing through the phases (i.e., U-phase and V-phase) other than the sensor phase (i.e., W-phase) are estimated, a current phase detector 18 of the current estimation section 17 calculates the current command values iu* and iv* of the other phases based on the electrical angle eθ, the d-axis current command value id*, and the q-axis current command value iq* by inverse dq transformation or the like. Alternatively, the current phase detector 18 can calculate only the current command value iv* of the V-phase.

Then, the current phase detector 18 calculates the α-axis current iα from the formula (10) using the current detection value iw.sns detected by the current sensor 15. Further, the current phase detector 18 calculates the β-axis current iβ from the formula (11) using the current detection value iw.sns and the current command value iv*. Then, the current phase detector 18 calculates the sensor-phase-relative current phase xθ from the formula (12) using the α-axis current iα and the β-axis current iβ.

Then, a reference wave estimator 19 of the current estimation section 17 calculates the estimation coefficient fu(xθ) from the formula (5) or a predetermined mapping table. Then, the reference wave estimator 19 calculates the current estimation value iu.est of the other phase (i.e., U-phase) from the formula (4) using the current detection value iw.sns and the estimation coefficient fu(xθ). Alternatively, the reference wave estimator 19 can calculate the current estimation value iu.est from the formula (3) using the current detection value iw.sns and the sensor-phase-relative current phase xθ. According to research conducted by the present inventors, the current estimation value calculated by using the current command value converges to a target value.

Generally, when formulas are implemented on a processor such as a microcomputer or an electronic control unit (ECU), sensor detection values and calculation values are processed as discrete values based on resolution (LSB) of the processor. Therefore, division by zero may occur in the formula (3) so that an unexpected estimation value may be calculated. To prevent such an unexpected estimation value, it is preferable that a limit should be set on the estimation coefficient fu(xθ) or the term 1/tan(xθ). Further, to prevent multiplication and division requiring heavy processing load, it is preferable that a mapping table defining a relationship between the sensor-phase-relative current phase xθ and the estimation coefficient fu(xθ) or the term 1/tan(xθ) should be prestored in a memory or the like. In this case, it is preferable that a limit should be set on the estimation coefficient fu(xθ) or the term 1/tan(xθ) in the mapping table. In such an approach, even when the sensor detection values and the calculation values are processed as discrete values, calculation can be accurately performed without heavy processing load. Thus, there is no need to use a high performance processor which is expensive.

After the current estimation value iu.est is calculated, an interpolation section 20 performs interpolation processing on the current estimation value iu.est if the current detection value iw.sns is zero. A reason for this is that when the current detection value iw.sns is zero, the current estimation value iu.est becomes zero, as shown in the formulas (3) and (4). At normal times other than the zero-crossing point of the current of the sensor phase, the interpolation section 20 outputs the current estimation value iu.est received from the reference wave estimator 19 as a interpolated current estimation value iu.est.fix without performing the interpolation processing. In contrast, at the zero-crossing point of the current of the sensor phase, the interpolation section 20 fixes the d-axis voltage command value Vd and the q-axis voltage command value Vq and outputs the interpolated current estimation value iu.est.fix by performing the interpolation processing on the current estimation value iu.est received from the reference wave estimator 19. It is noted that the zero-crossing point can have a predetermined margin of error, for example, of ±10 A or ±5 LSB. The interpolation processing on the current estimation value iu.est is not limited to a predetermined method. For example, in the interpolation processing, the previous current estimation value iu.est can be used as the interpolated current estimation value iu.est.fix. Alternatively, in the interpolation processing, the current estimation value iu.est, which is calculated by inverse dq transformation based on the previous d-axis current estimation value id.est and the previous q-axis current estimation value iq.est, can be used as the interpolated current estimation value iu.est.fix.

Then, a dq transformation section 21 of the current estimation section 17 calculates the d-axis current estimation value id.est and the q-axis current estimation value iq.est by dq transformation based on the current detection value iw.sns and the interpolated current estimation value iu.est.fix.

As described above, at the zero crossing point of the current of the sensor phase, the interpolation processing on the current estimation value iu.est is performed. Thus, even when it is impossible to accurately calculate the current estimation value iu.est due to the zero crossing point of the current of the sensor phase, a sharp change in the current estimation value iu.est can be avoided. Further, at the zero crossing point of the current of the sensor phase, the d-axis voltage command value Vd and the q-axis voltage command value Vq are fixed. Thus, the effect of an error of the current estimation value iu.est on the d-axis voltage command value Vd and the q-axis voltage command value Vq can be avoided. In other words, variations in the d-axis voltage command value Vd and the q-axis voltage command value Vq due to the error of the current estimation value iu.est can be avoided.

Figure 7:
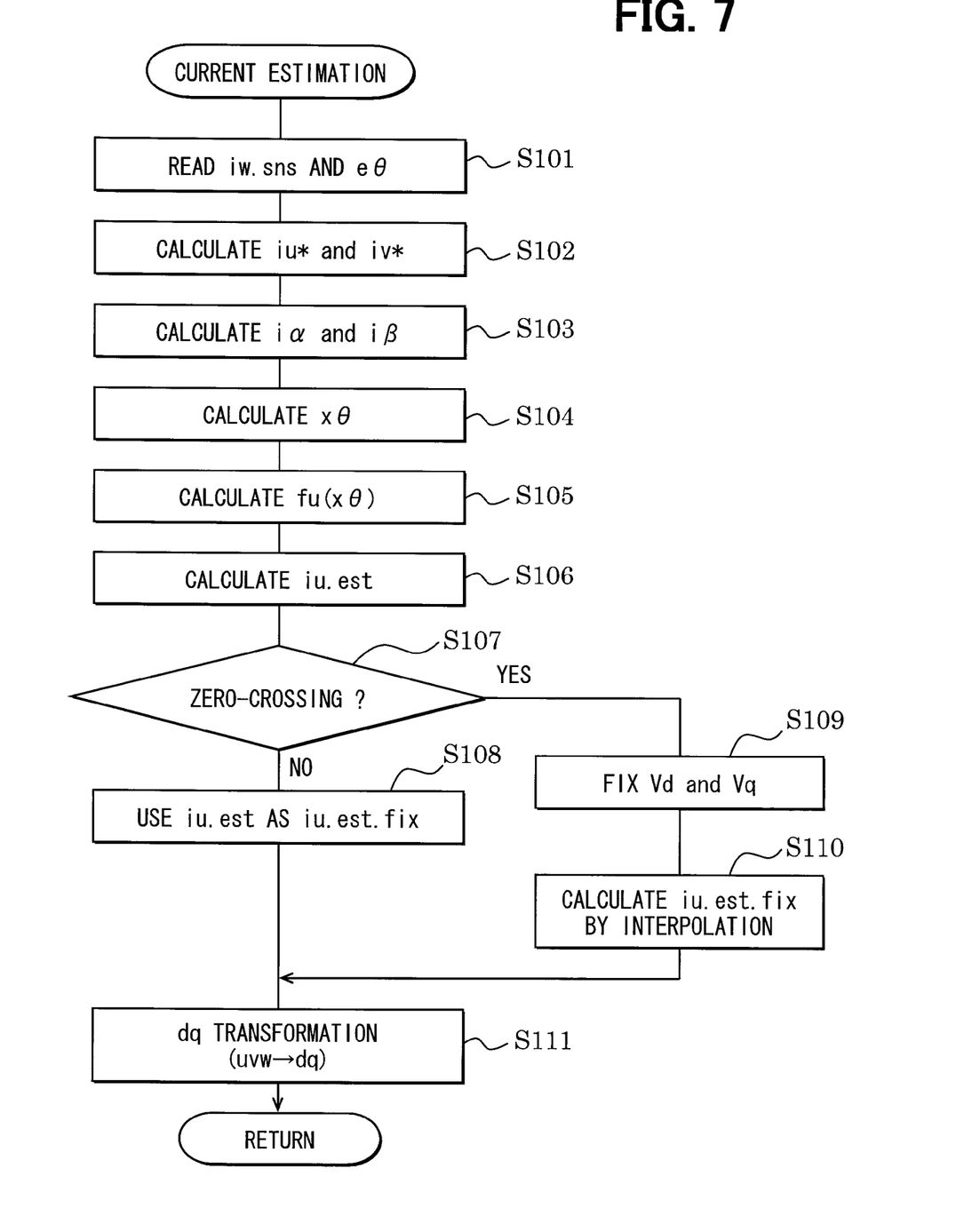
FIG. 7 is a flow chart of a current estimation routine.

The above described current estimation is performed by the motor controller 16 in accordance with a current estimation routine shown in FIG. 7. The current estimation routine is described below.

When the motor controller 16 is powered ON, the motor controller 16 repeatedly performs the current estimation routine at a predetermined time interval. The current estimation routine starts at S101, where the motor controller 16 reads the current detection value iw.sns detected by the current sensor 15. Further, at S101, the motor controller 16 reads the electrical angle eθ, which is calculated based on the rotation position m8 detected by the rotor position sensor 14.

Then, the current estimation routine proceeds to S102, where the motor controller 16 calculates the current command values iu* and iv* of the other phases based on the electrical angle eθ, the d-axis current command value id*, and the q-axis current command value iq* by inverse dq transformation. Alternatively, at S102, the motor controller 16 can calculate only the current command value iv* of the V-phase.

Then, the current estimation routine proceeds to S103, where the motor controller 16 calculates the α-axis current iα from the formula (10) using the current detection value iw.sns. Further, at S103, the motor controller 16 calculates the β-axis current iβ from the formula (11) using the current detection value iw.sns and the current command value iv*. Then, the current estimation routine proceeds to S104, where the motor controller 16 calculates the sensor-phase-relative current phase xθ from the formula (12) using the α-axis current iα and the β-axis current iβ.

Then, the current estimation routine proceeds to S105, where the motor controller 16 calculates the estimation coefficient fu(xθ) from the formula (5) or a predetermined mapping table. Then, the current estimation routine proceeds to S106, where the motor controller 16 calculates the current estimation value iu.est from the formula (4) using the current detection value iw.sns and the estimation coefficient fu(xθ). Alternatively, at S105, the motor controller 16 can calculate the current estimation value iu.est from the formula (3) using the current detection value iw.sns and the sensor-phase-relative current phase xθ.

Then, the current estimation routine proceeds to S107, where the motor controller 16 determines whether the zero crossing of the current of the sensor phase occurs by determining whether the current detection value iw.sns is zero (A). In this case, when the current detection value iw.sns falls within a predetermined range including zero, the motor controller 16 can determine that the zero crossing occurs. For example, when an absolute value of the current detection value iw.sns is less than a predetermined value or when an absolute value of the estimation coefficient fu(xθ) is greater than a predetermined value, the motor controller 16 can determine that the zero crossing occurs. Alternatively, since the current detection value iw.sns changes synchronously with the sensor-phase-relative current phase xθ, the motor controller 16 can determine whether the zero crossing occurs based on the sensor-phase-relative current phase xθ.

If the motor controller 16 does not determine that the zero crossing occurs corresponding to NO at S107, the current estimation routine proceeds to S108, where the motor controller 16 sets the current estimation value iu.est, which is calculated at S106, as the interpolated current estimation value iu.est.fix.

In contrast, if the motor controller 16 determines that the zero crossing occurs corresponding to YES at S107, the current estimation routine proceeds to S109, where the motor controller 16 fixes the d-axis voltage command value Vd and the q-axis voltage command value Vq. For example, the motor controller 16 can fix the d-axis voltage command value Vd and the q-axis voltage command value Vq by maintaining the previous d-axis voltage command value Vd and the previous q-axis voltage command value Vq unchanged. Alternatively, the motor controller 16 can fix the d-axis voltage command value Vd and the q-axis voltage command value Vq by forcibly setting the deviations Δid and Δiq (refer to FIG. 3) to zero.

After S109, the current estimation routine proceeds to S110, where the motor controller 16 calculates the interpolated current estimation value iu.est.fix by performing the interpolation processing on the current estimation value iu.est. For example, in the interpolation processing, the previous current estimation value iu.est can be used as the interpolated current estimation value iu.est.fix. Alternatively, in the interpolation processing, the current estimation value iu.est, which is calculated by inverse dq transformation based on the previous d-axis current estimation value id.est and the previous q-axis current estimation value iq.est, can be used as the interpolated current estimation value iu.est.fix.

After S108 or S110, the current estimation routine proceeds to S111, where the motor controller 16 calculates the d-axis current estimation value id.est and the q-axis current estimation value iq.est by dq transformation based on the current detection value iw.sns and the interpolated current estimation value iu.est.fix.

The embodiment can be summarized as follows. According to the embodiment, the sensor-phase-relative current phase xθ is calculated based on the α-axis current iα and the β-axis current iβ that are defined in the stationary coordinate system (αβ coordinate system) relative to the sensor phase. In such an approach, the actual current phase xθ relative to the sensor phase can be calculated. Further, the current estimation value iu.est of the other phase is calculated based on the sensor-phase-relative current phase xθ and the current detection value iw.sns of the other phase. In such an approach, the current estimation value iu.est can be calculated with consideration of variation factors such as harmonic components of the actual current phase xθ. Thus, the current estimation value iu.est can be calculated accurately.

Figure 8A:
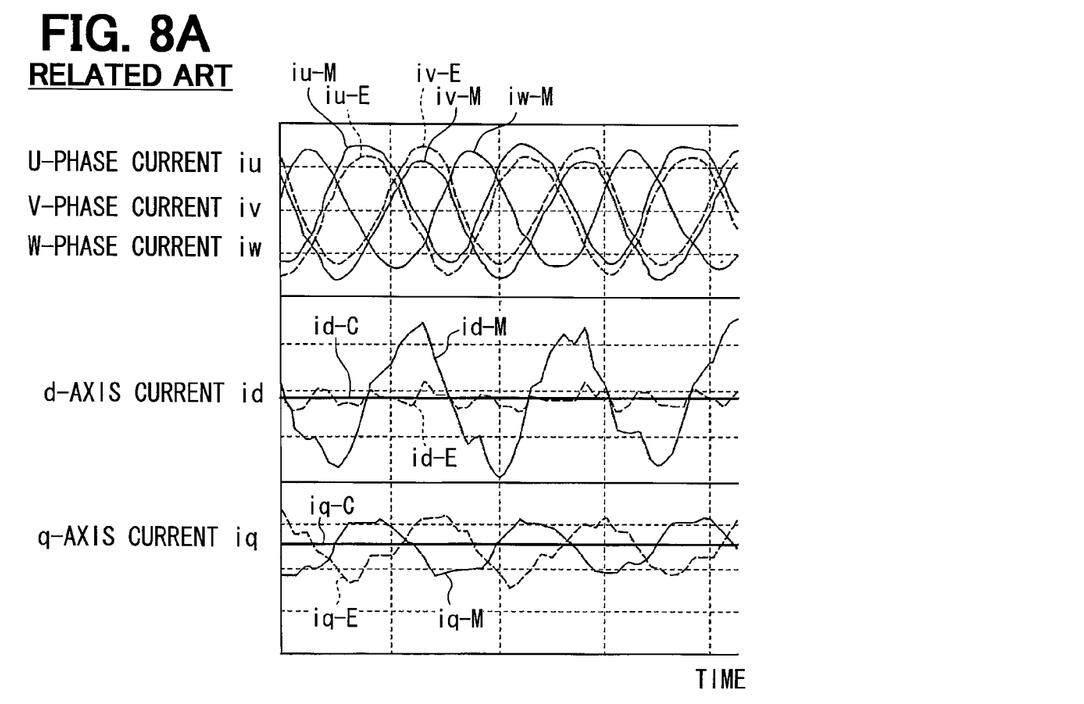
FIG. 8A is a timing diagram according to the comparison example.
Figure 8B:
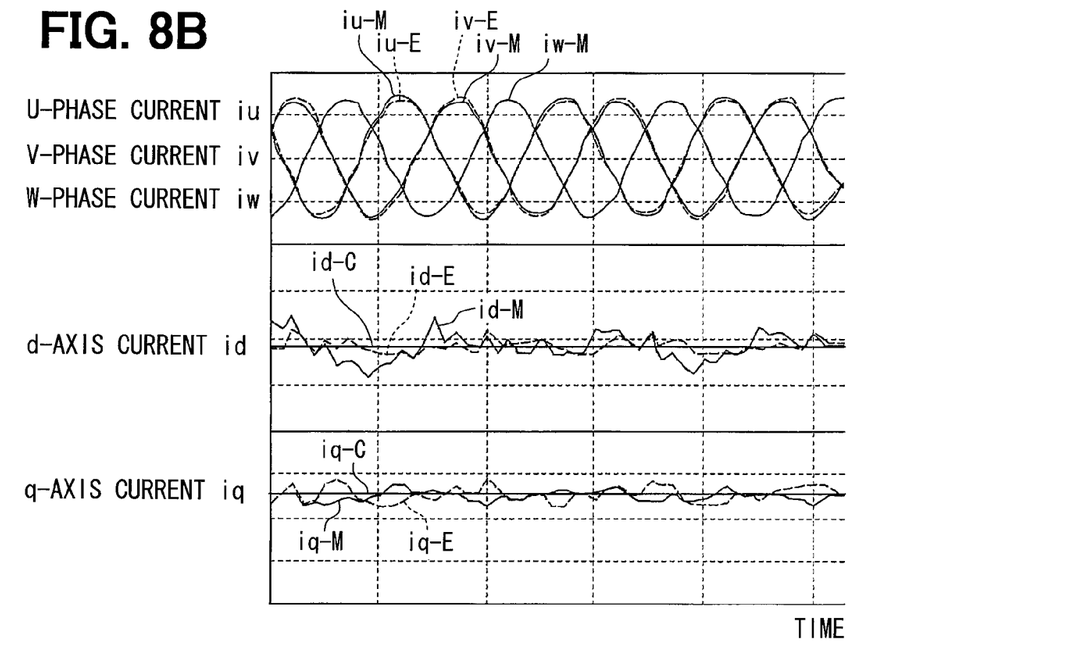
FIG. 8B is a timing diagram according to the embodiment.

Like the comparison example shown in FIG. 5A, when the α-axis current iα is calculated based on the current detection value iw.sns of the sensor phase (i.e., W-phase), and the β-axis current iβ is calculated based on the current command values iu* and iv* of the other phases (i.e., U-phase and V-phase), the region B where the calculation error of the sensor-phase-relative current phase xθ is large becomes relatively wide. As a result, as shown in FIG. 8A, accuracy of the sensor-phase-relative current phase and accuracy of the current estimation values calculated based on the sensor-phase-relative current phase cannot be adequately improved, and periodic variations can occur in the d-axis current and the q-axis current. In FIG. 8A and FIG. 8B, which is described below, iu-M represents a measurement value of a U-phase current iu, iu-E represents an estimation value of the U-phase current iu, iv-M represents a measurement value of a V-phase current iv, iv-E represents an estimation value of the V-phase current iv, iw-M represents a measurement value of a W-phase current iw, iw-E represents an estimation value of the W-phase current iw, id-C represents a command value of a d-axis current id, id-M represents a measurement value of the d-axis current id, id-E represents an estimation value of the d-axis current id, iq-C represents a command value of a q-axis current iq, iq-M represents a measurement value of the q-axis current id, iq-E represents an estimation value of the q-axis current iq.

In contrast, according to the embodiment, the α-axis current iα is calculated based on the current detection value iw.sns of the sensor phase (i.e., W-phase), and the β-axis current iβ is calculated based on the current detection value iw.sns and the current command value iv* of the other phase (i.e., V-phase). In such an approach, the current detection value iw.sns can have effect on the β-axis current iβ. Accordingly, while the region A where the calculation error of the sensor-phase-relative current phase xθ is small is enlarged, the region B where the calculation error of the sensor-phase-relative current phase xθ is large is narrowed. As a result, as shown in FIG. 8B, the accuracy of the sensor-phase-relative current phase is improved so that the accuracy of the current estimation values can be improved, and periodic variations in the d-axis current and the q-axis current can be reduced. Further, responsiveness (i.e., convergence) of the current estimation value to the actual value (i.e., measured value) during transient period, where the current command value changes, can be improved.

Further, according to the embodiment, the d-axis current estimation value id.est and the q-axis current estimation value iq.est are calculated based on the current detection value iw.sns and the current estimation value iu.est. In such an approach, the d-axis current estimation value id.est and the q-axis current estimation value iq.est can be accurately calculated. Since the feedback control of the current is performed by using the d-axis current estimation value id.est and the q-axis current estimation value iq.est, the AC motor 13 is stably driven.

Further, according to the embodiment, the current estimation value iu.est of the other phase is calculated by calculating the estimation coefficient fu(xθ), which depends on the sensor-phase-relative current phase xθ, and by multiplying the current detection value iw.sns by the estimation coefficient fu(xθ). In such an approach, the current estimation value iu.est can be calculated without using the current amplitude. Therefore, accuracy of the current estimation value iu.est can be improved.

Further, according to the embodiment, one current sensor is used to detect the current detection value of one phase, and the current of the other phase is estimated based on the current detection values. In such an approach, an error caused by a difference in gain between multiple current sensors used in a conventional motor control system can be prevented. Thus, a variation in output torque of the AC motor is removed so that vibration of the vehicle can be removed.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiment, the sensor phase is the W-phase. Alternatively, the sensor phase can be the U-phase or the V-phase.

In the embodiment, the other phase is the U-phase. Alternatively, the other phase can be the V-phase or the W-phase.

In the embodiment, the $\beta$-axis current $i\beta$ is represented with the current command value iv* of the V-phase and the current detection value iw.sns of the sensor phase (i.e., W-phase). Alternatively, the $\beta$-axis current $i\beta$ can be represented with the current command value iu* of the U-phase and the current detection value iw.sns of the sensor phase (i.e., W-phase). That is, the $\alpha$-axis current $i\alpha$ can be represented with the current detection value of the sensor phase, and the $\beta$-axis current $i\beta$ can be represented with the current detection value of the sensor phase and the current command value of one of two phases other than the sensor phase.

In the embodiment, the present disclosure is applied to a system including one set of an inverter and an AC motor. Alternatively, the present disclosure can be applied to a system including multiple sets of an inverter and an AC motor. Alternatively, the present disclosure can be applied to a system, which is used in a train or the like, including one inverter and multiple AC motors connected in parallel to the inverter.

In the embodiment, since the current of only one phase is detected, the current of the other phase is estimated to establish the dq transformation. Alternatively, new dq transformation that can be established by the current detection value of only one phase can be created and used. The present inventors have confirmed that both methods can produce the same result mathematically.

Figure 1:
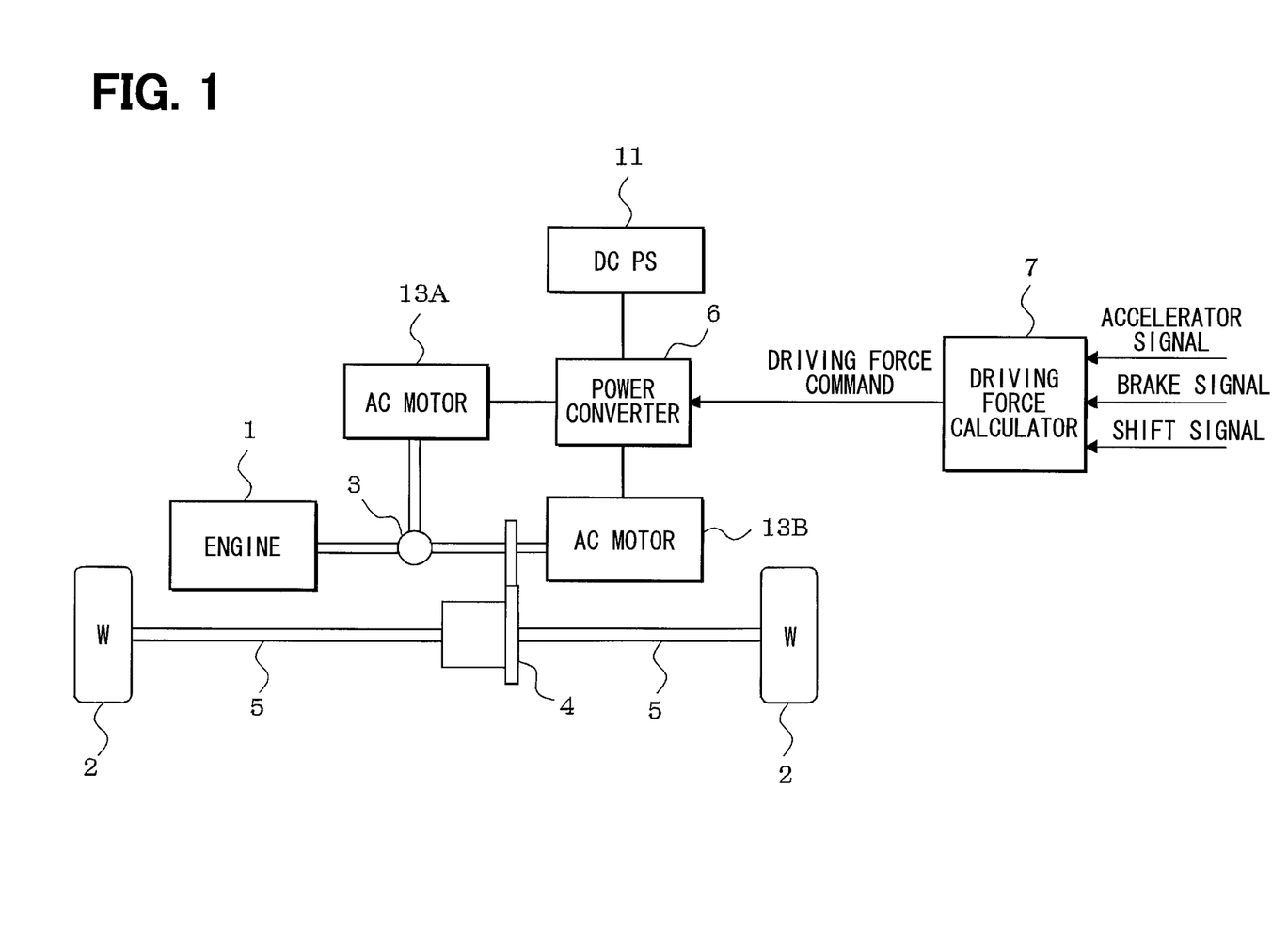
FIG. 1 is a block diagram of a hybrid vehicle driving system according to an embodiment of the present disclosure.

In the embodiment, the present disclosure is applied to a hybrid vehicle having a structure shown in FIG. 1. Alternatively, the present disclosure can be applied to an electric vehicle and a hybrid vehicle having another structure. Alternatively, the present disclosure can be applied to a controller for controlling an AC motor used in an apparatus other than an electric vehicle and a hybrid vehicle.

What is claimed is:

1. A controller for controlling a three-phase AC motor, the controller comprising:
   a current sensor configured to detect a current flowing through one phase of the AC motor, the one phase being defined as a sensor phase;
   a current estimation section configured to calculate a current phase relative to an axis of the sensor phase based on a $\alpha$-axis current and a $\beta$-axis current in a stationary coordinate system defined by a $\alpha$-axis parallel to the axis of the sensor phase and a $\beta$-axis perpendicular to the axis of the sensor phase, the current estimation section configured to calculate an estimation value of a current flowing through another phase of the AC motor based on the current phase and the current detected by the current sensor, wherein
   the current estimation section calculates the $\alpha$-axis current based on the current detected by the current sensor, and
   the current estimation section calculates the $\beta$-axis current based on the current detected by the current sensor and a command value for the current flowing through the other phase of the AC motor.

2. The controller according to claim 1, wherein
   the current estimation section calculates an estimation coefficient which depends on the current phase, and
   the current estimation section calculates the estimation value of the current flowing through the other phase by multiplying the current detected by the current sensor by the estimation coefficient.

3. The controller according to claim 2, further comprising:
   a control section, wherein
   the current estimation section calculates a d-axis current estimation value and a q-axis current estimation value in a rotating coordinate system of the AC motor based on the current detected by the current sensor and the estimation value of the current flowing through the other phase, and
   the control section controls energization of the AC motor based on the d-axis current estimation value and the q-axis current estimation value.

4. The controller according to claim 1, further comprising:
   a control section, wherein
   the current estimation section calculates a d-axis current estimation value and a q-axis current estimation value in a rotating coordinate system of the AC motor based on the current detected by the current sensor and the estimation value of the current flowing through the other phase, and
   the control section controls energization of the AC motor based on the d-axis current estimation value and the q-axis current estimation value.

5. A motor control system for controlling a three-phase AC motor, the motor control system comprising:
   a current sensor configured to detect a current flowing through only one phase of the AC motor, the only one phase being defined as a sensor phase; and
   a controller configured to:
     calculate a current phase relative to an axis of the sensor phase based on a $\alpha$-axis current and a $\beta$-axis current in a stationary coordinate system defined by a $\alpha$-axis parallel to the axis of the sensor phase and a $\beta$-axis perpendicular to the axis of the sensor phase; and
     calculate an estimation value of a current flowing through another phase of the AC motor based on the current phase and the current detected by the current sensor; wherein
     the $\alpha$-axis current is calculated based on the current detected by the current sensor; and
     the $\beta$-axis current is calculated based on the current detected by the current sensor and a command value for the current flowing through the other phase of the AC motor.

6. The motor control system according to claim 5, wherein the controller is further configured to:
   calculate an estimation coefficient which depends on the current phase, and calculate the estimation value of the current flowing through the other phase by multiplying the current detected by the current sensor by the estimation coefficient.

7. The motor control system according to claim 6, wherein the controller is further configured to:
   calculate a d-axis current estimation value and a q-axis current estimation value in a rotating coordinate system of the AC motor based on the current detected by the current sensor and the estimation value of the current flowing through the other phase, and
   control energization of the AC motor based on the d-axis current estimation value and the q-axis current estimation value.

8. The motor control system according to claim 5, wherein the controller is further configured to:
   calculate a d-axis current estimation value and a q-axis current estimation value in a rotating coordinate system of the AC motor based on the current detected by the current sensor and the estimation value of the current flowing through the other phase, and
   control energization of the AC motor based on the d-axis current estimation value and the q-axis current estimation value.

* * * * *